United States Patent
Teasdale et al.

[11] Patent Number: 6,102,827
[45] Date of Patent: Aug. 15, 2000

[54] CLUTCH ASSEMBLY WITH A PLANETARY GEAR SET

[75] Inventors: Max J. Teasdale, Boise, Id.; Kent C. Bates, Chillicothe; Jose M. Salazar-Vior, Washington, both of Ill.

[73] Assignee: Caterpillar Inc., Peoria, Ill.

[21] Appl. No.: 09/301,468

[22] Filed: Apr. 28, 1999

[51] Int. Cl.[7] .................................................. F16D 65/78
[52] U.S. Cl. .......................... 475/154; 475/149; 192/21.5
[58] Field of Search ................... 475/149, 154; 192/21.5, 84.1, 84.2, 84.21, 57

[56] References Cited

U.S. PATENT DOCUMENTS

| | | |
|---|---|---|
| 3,262,534 | 7/1966 | Monroe et al. . |
| 3,415,346 | 12/1968 | Boeskool et al. . |
| 3,469,665 | 9/1969 | Murata et al. . |
| 3,620,335 | 11/1971 | Hendershot ............................. 192/21.5 |
| 4,895,233 | 1/1990 | Inoue et al. ............................. 192/21.5 |
| 4,898,267 | 2/1990 | Garrett et al. .......................... 192/21.5 |
| 4,967,887 | 11/1990 | Annacchino et al. .................. 192/21.5 |
| 5,054,593 | 10/1991 | Carlson ................................... 192/21.5 |
| 5,322,484 | 6/1994 | Reuter ................................. 192/21.5 X |
| 5,525,642 | 6/1996 | Cipriano et al. ......................... 523/149 |
| 5,598,908 | 2/1997 | York et al. .............................. 192/21.5 |
| 5,713,444 | 2/1998 | Schroeder ............................... 192/21.5 |
| 5,890,983 | 4/1999 | Kawahara et al. .................. 192/21.5 X |

OTHER PUBLICATIONS

Peter Lynwander, "Planetary Gear Trains", Gear Drive Systems, Marcel Dekker Inc, New York, USA (pp. 293–323).

Primary Examiner—Rodney H. Bonck
Assistant Examiner—Saúl Rodríguez
Attorney, Agent, or Firm—Howard & Howard; Jeffrey L. Myers

[57] ABSTRACT

A clutch includes a stationary housing member, a rotating member supported for rotation with respect to the stationary housing member, and a planetary gear assembly operably interconnecting the rotating member to an output shaft. The planetary gear assembly reduces the magnitude of speed transmitted to the output shaft. An actuating mechanism is used to switch the rotating member between a disengaged position where the rotating member rotates freely with respect to the stationary housing member and an engaged position where the rotating member is grounded to the stationary housing member. The actuating mechanism includes a magneto rheological fluid and a plurality of actuation coils. An electric current is supplied to the creating a magnetic flux. When a current is applied to the coils, the rotating member is placed in the engaged position and when there is no current in the coils, the rotating member is in the disengaged position.

31 Claims, 4 Drawing Sheets

CLUTCH ASSEMBLY WITH A PLANETARY GEAR SET

TECHNICAL FIELD

The present invention relates generally to a magneto rheological clutch that transmits torque from an input shaft to an output shaft. The clutch includes a planetary gear assembly that reduces the magnitude of input speed transmitted to the output shaft.

BACKGROUND ART

Magneto-rheological clutch assemblies are used to transfer torque from an input member to an output member. These clutches use a magneto-rheological fluid in combination with excitation coils to control the speed of a rotating member. An example of such a clutch assembly is shown in U.S. Pat. No. 5,598,908.

One disadvantage of using magneto-rheological clutches in earthmoving machines is the high input torque and input speeds that are supplied to the clutch. In an application such as an agricultural tractor power-take-off (PTO), the engine and transmission can supply high torque to a clutch assembly. The magneto-rheological fluid has a centrifugal load limit which can be exceeded if clutch members are rotating too fast.

Typically, a power-take-off (PTO) is driven by the clutch assembly to run other agricultural machinery. Often, the other machinery does not require high torque input to run the machinery. If the machinery experiences a problem, the clutch can overload the machinery by exceeding the torque limit of the machinery. This can cause irreparable damage to the machinery.

Thus, it is desirable to have a magneto-rheological clutch that can operate at higher torque outputs while having the capability to operate at lower torque loads during certain applications.

The present invention is directed to overcoming one or more of the problems as set forth above.

DISCLOSURE OF THE INVENTION

According to one embodiment of the present invention, a clutch assembly is used for transferring torque from an input to an output. The clutch includes a stationary housing member and a rotating member supported for rotation with respect to the stationary housing member about an axis of rotation. An input drives the rotating member and an output receives torque from the rotating member. A planetary gear assembly operably interconnects the rotating member to the output. The planetary gear assembly reduces the magnitude of speed from the input to the output.

The clutch assembly is preferably a magneto Theological clutch where the rotating member is spaced apart from the stationary housing member at a predetermined distance to define a chamber therebetween. An actuating mechanism includes magneto- rheological fluid and a plurality of actuation coils for switching the rotating member between a disengaged position where the rotating member rotates freely with respect to the stationary housing member and an engaged position where the rotating member is grounded to the stationary member.

The combination of a magneto Theological clutch and a planetary gear assembly allows the clutch to operate at both high and low input torques and speeds without damaging clutch components or other machinery being run off of a PTO.

BEST MODE FOR CARRYING OUT THE INVENTION

Figure 1:
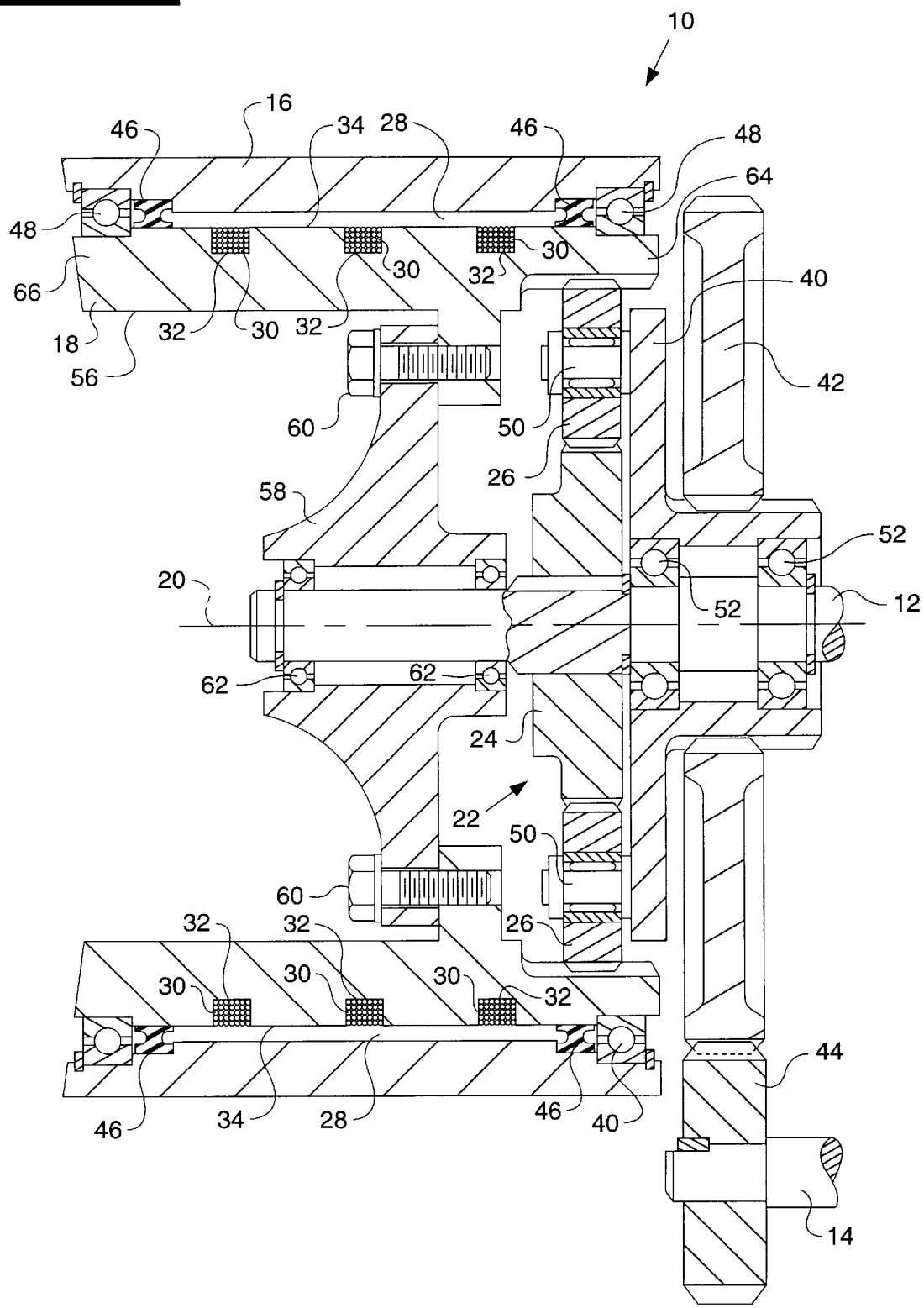
FIG. 1 is a cross-sectional view of a clutch assembly incorporating the subject invention.

Referring to the Figures, wherein like numerals indicate like or corresponding parts throughout the several views, a clutch assembly 10 is generally shown in FIG. 1. The clutch assembly 10 is used to transfer torque from an input shaft 12 receiving torque from an engine to an output shaft 14 for supplying torque to a machine system, such as a PTO, for example.

The clutch assembly includes a stationary housing member 16 and a rotating member 18 supported for rotation with respect to the stationary housing member 16 about an axis of rotation 20. The input shaft 12 drives the rotating member 18 and the output shaft 14 is driven by the rotating member 18.

A planetary gear assembly, shown generally at 22, operably interconnects the rotating member 18 to the output shaft 14. The planetary gear assembly 22 is used to reduce the magnitude of speed from the input shaft 12 to the output shaft 14. The planetary gear assembly 22 is comprised of a sun gear 24 supported for rotation about the axis 20 with the input shaft 12 and a plurality of planet gears 26 spaced circumferentially about the sun gear 24. The planet gears 26 have a plurality of gear teeth that engage gear teeth located on the rotating member 18.

An actuating mechanism is used to switch the rotating member 18 between a disengaged position where the rotating member 18 rotates freely with respect to the stationary housing member 16 and an engaged position where the rotating member 18 is grounded to the stationary housing member 16. The rotating member 18 drives the planet gears 26 causing them to rotate about the sun gear 24 when the rotating member 18 is in the engaged position. Thus, one member, i.e. the stationary housing member 16, of the clutch 10 is stationary during both engagement and disengagement.

In the preferred embodiment, the actuating mechanism is comprised of a magneto Theological fluid received in a chamber 28, formed between the stationary housing 16, and the rotating member 18 and a plurality of actuation coils 30. The coils 30, when electrically energized, are used to selectively apply a magnetic field to the magneto rheological fluid. When a current is applied to the actuation coils 30, the rotating member 18 is placed in the engaged position and thus is grounded to the stationary housing 16. When there is no current in the coils 30, the rotating member 18 is in the disengaged position. The use of magneto rheological fluid in combination with coils is well known in the art. The composition and properties of the magneto-rheological fluid are well known and an example of such fluid in a clutch is disclosed in U.S. Pat. No. 5,598,908. The current is supplied to the coils 30 by means well known by those skilled in the art.

The clutch assembly 10 preferably has a plurality of coils 30, which when energized by an electric current, create a magnetic flux by interaction in the fluid. The coils 30 are preferably made from copper wire coated with a varnish, however, other conductive materials known in the art could also be used. In order for the clutch 10 to operate efficiently, a high magnetic flux is needed across the gap formed between the stationary housing 16 and the rotating member 18. In order to achieve this high magnetic flux, multiple coils are needed. Preferably at least three (3) coils are used. As the current to the coils 30 increases, the magnetic flux increases and the rotational speed of the rotating member 18 decreases. As the current to the coils 30 is increased, the rotating member 18 eventually becomes grounded to the stationary housing 16.

In one embodiment, a plurality of grooves 32 extend about an exterior surface 34 of the rotating member 18. The actuation coils 30 are received and held in place within these grooves 32. In this configuration, slip rings (not shown) are needed in order to supply current to the coils 30.

Figure 2:
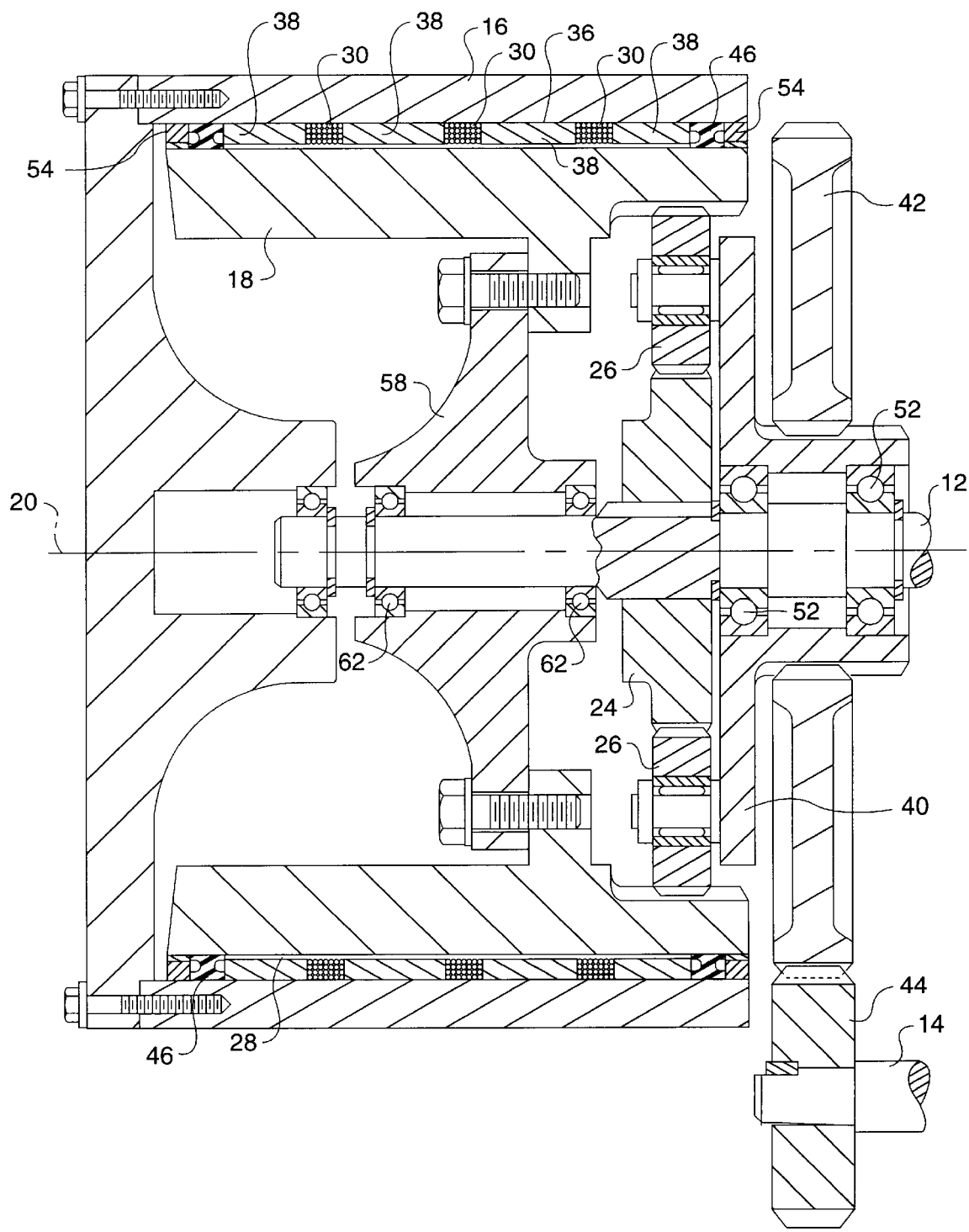
FIG. 2 is an alternate embodiment of a clutch assembly incorporating the subject invention.

In an alternate embodiment, shown in FIG. 2 the coils 30 are supported on an interior surface 36 of the stationary housing member 16 and are held in place by a plurality of spacers 38 supported by the stationary housing member 16. The spacers 38 have a predetermined thickness to provide a sufficient gap between the spacers 38 and the rotating member 16 for forming the chamber 28. It is important that the gap between the spacers 38 and the rotating member 16 be as small as possible without causing interference between the spacers 38 and the rotating member 16 so that the flux created by current in the coils 30 is easily distributed throughout the fluid.

In this configuration the coils are wound about a mandrel and then placed within the stationary housing member 16. The spacers 38 are mounted to the stationary housing member 16 and are used to hold the coils 30 in place. The advantage with this configuration is that slip rings are not needed to supply current to the coils 30.

The grooves 32 define a depth extending into the rotating member 18 and a width. The grooves 32 are preferably spaced apart from one another by up to two times the width to ensure that proper flux is supplied by the coils 30 to the magneto rheological fluid. In the embodiment shown in FIG. 2, the coils 30 must be spaced apart from one another by up to two times the width between the spacers 38.

As shown in FIG. 1, the clutch assembly 10 includes a carrier 40 fixed for rotation with the planet gears 26 and which is rotatably supported on the input shaft 12. Planet pins 50 are used to attach the carrier 40 to the planet gears 26. A plurality of bearings 52 are used to rotatably support the carrier 40 on the input shaft 12. A drive gear 42 is fixed for rotation with the carrier 40 and engages a mating gear 44 supported on the output shaft 14. The input shaft 12, the sun gear 24, the carrier 40, the drive gear 42 are concentric with the respective centers aligning with the axis of rotation 20. The drive gear 42 is preferably splined to the carrier 40 for rotation therewith. Thus, the carrier 40 transmits torque from the planet gears 26 to the output shaft 14 via the drive gear 42.

The rotating member 18 has a central bore 56 which receives a support member 58. The support member 58 is mounted to the rotating member 18 by a plurality of fasteners 60. The support member 58 is rotatably supported on the input shaft 12 by at least one bearing 62.

The clutch assembly 10 includes at least one seal 46 between the stationary housing member 16 and the rotating member 18 for sealing the fluid within the chamber 28. In one embodiment, two (2) double-lipped seals are inserted between the stationary housing 16 and the rotating member 18 at each end of the housing 16.

In one embodiment, shown in FIG. 1, the clutch assembly 10 includes at least one bearing 48 installed between the stationary housing member 16 and the rotating member 18 for rotatably supporting the rotating member 18 with respect to the housing member 16. In this configuration, the rotating member is preferably a planetary ring gear having a toothed portion 64 and an extended body portion 66. The stationary housing 16 is supported along the extended body portion 66 by the bearings 48. The toothed portion 64 engages the planet gears 26.

The magneto Theological fluid has a predetermined centrifugal load limit dependent upon rotational speed of the ring gear 18. The ring gear interacts with the planetary gear assembly 22 to reduce rotational speed from the input shaft 12 to the output shaft 14 and prevents the magneto Theological fluid from exceeding the predetermined centrifugal load limit when the ring gear 18 is in the engaged position. The ring gear also reduces the centrifuge effect and induces mixing of the magneto Theological fluid during disengagement when configured with the rotating member 18 supported within an interior bore of the stationary housing member 16.

If a low torque machine is being run off of a PTO attached to the clutch assembly, a torque level can be set at which the clutch will slip. Thus, if the machine experiences a problem, the clutch assembly will supply torque up to a certain limit and then the clutch will slip. This avoids damaging the machine with a torque overload.

In an alternate embodiment, shown in FIG. 2, the bearing 48 is replaced by at least one bushing 54 installed between the stationary housing member 16 and the rotating member 18 for providing a bearing surface as the rotating member 18 rotates about the axis of rotation 20. The bushing 54 is preferably a steel backed bronze bushing, however, other bushings and bushing materials known in the art could also be used. The advantage with this configuration is that requirement for the large diameter bearing 48 (see FIG. 1) is eliminated. The bushing 54 is needed to resist deflection of the rotating member 18 when the rotating member 18 is under load.

Figure 3:
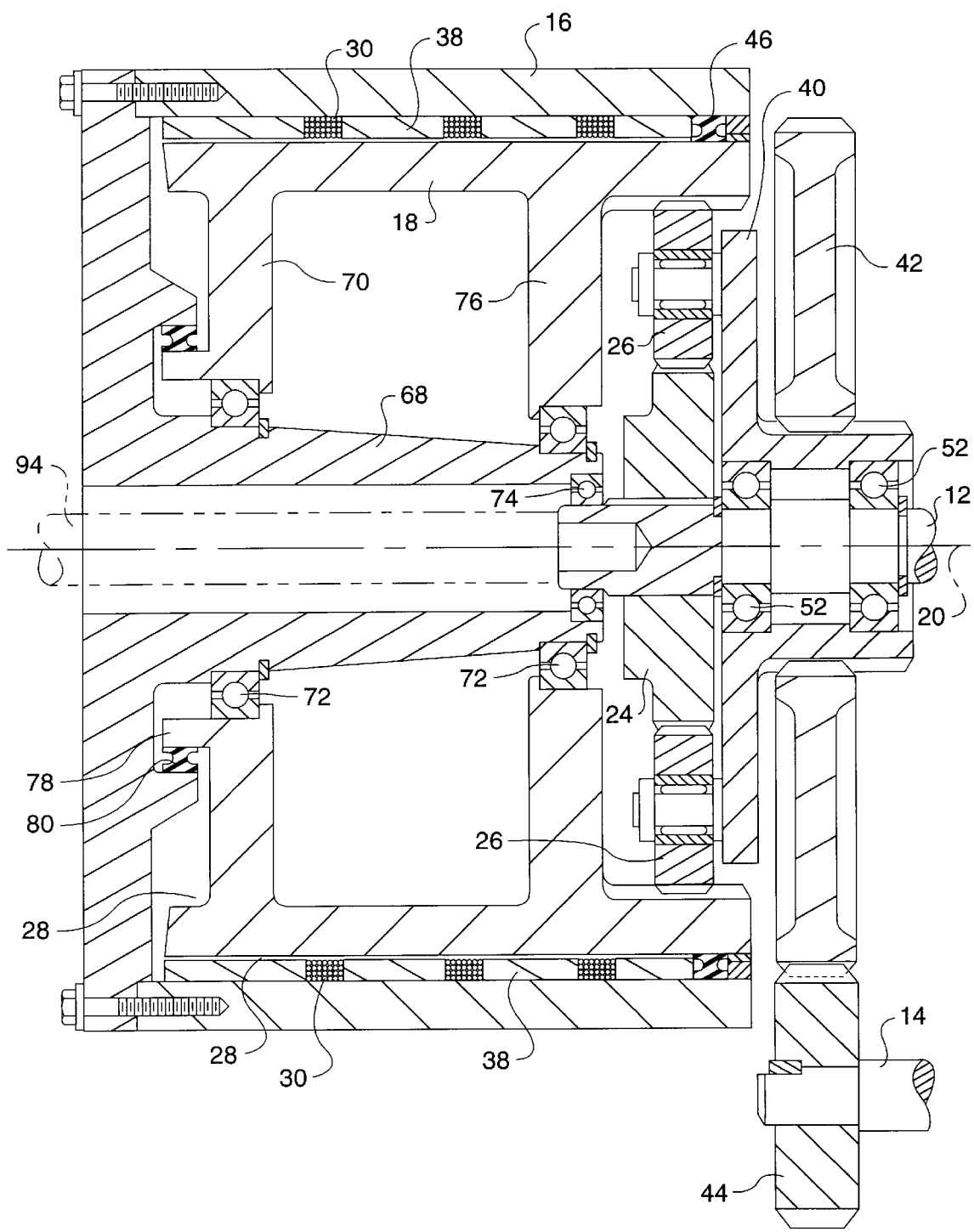
FIG. 3 is an alternate embodiment of a clutch assembly incorporating the subject invention.

In an alternate embodiment, shown in FIG. 3, a support shaft 68 is rotatably supported on the input shaft 12 to rotatably support the rotating member 18 with respect to the stationary housing member 16. A bearing 74 is installed between the support shaft 68 and the input shaft 12 for rotating support. An installation tool 94, shown in dashed lines, is used to properly orientate the shaft 12 and bearing 74. At least one support member 70 is fixed for rotation with the rotating member 18 and is supported on the support shaft 68 by at least one bearing 72. The support member 70 is preferably integrally formed as one piece with the rotating member 18. A second support member 76, spaced apart from the first support member 70, is preferably used to provide adequate support and stability for the rotating member 18. The support member 70 has a flange 78 for receiving at least one seal 80 for sealing the fluid within the chamber 28.

This embodiment offers the advantage of eliminating one of the large diameter seals 46 from the clutch assembly 10. The seal 80 has a significantly smaller diameter than seal 46 and is less expensive and easier to install.

Figure 4:
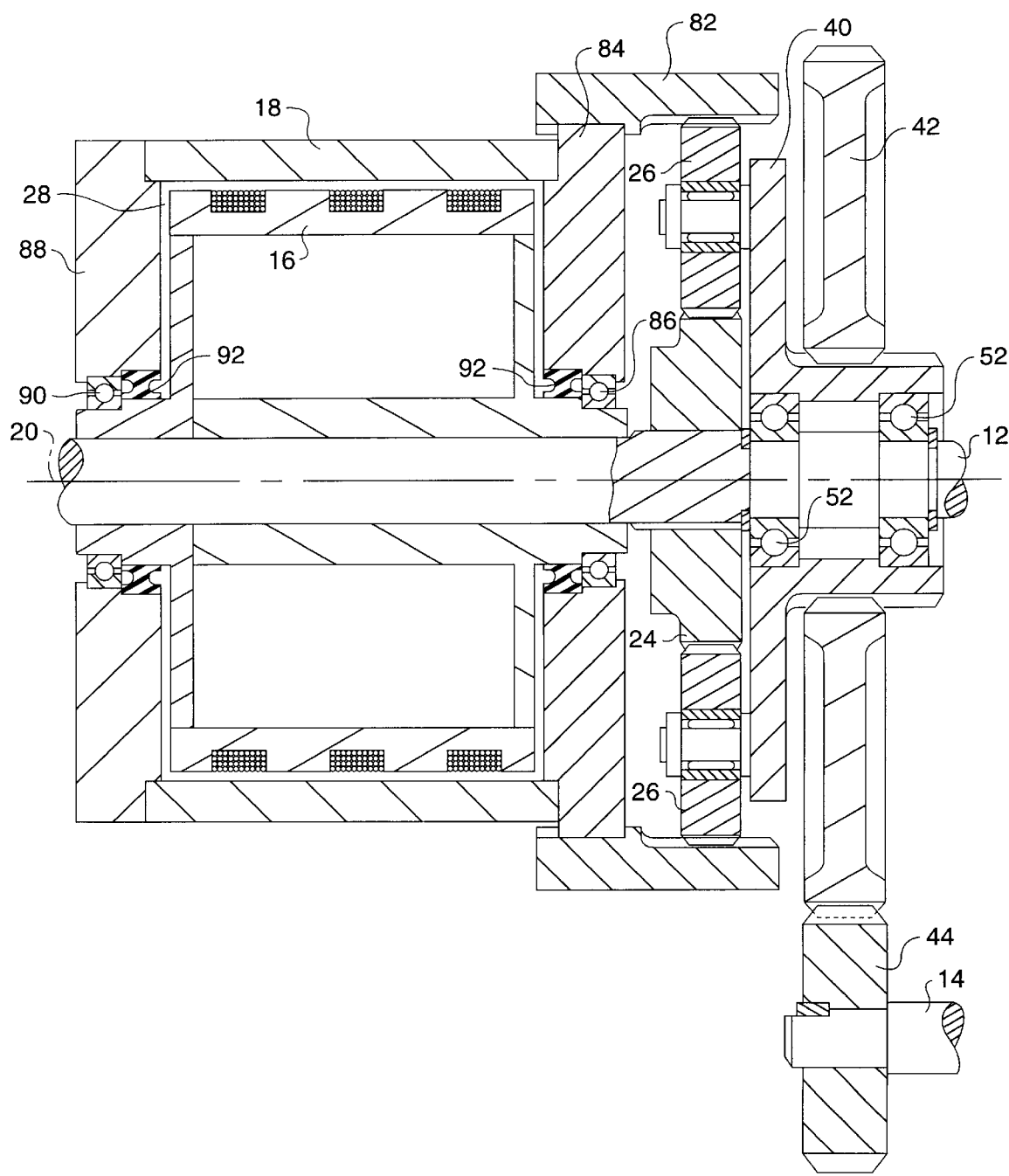
FIG. 4 is an alternate embodiment of a clutch assembly incorporating the subject invention.

In an alternate embodiment, shown in FIG. 4, the stationary housing member 16 is mounted within the rotating member 18. A planetary ring gear 82 is mounted to the rotating member 18 for rotation with the rotating member 18 about the axis of rotation 20. A support member 84 is fixed to the ring gear 82 and is rotatably supported on the stationary housing member 16 by a bearing 86. A second support member 88 is rotatably supported by a bearing 90 on the stationary housing member 16 at an end opposite from the first support member 84. A pair of seals 92 are installed between the stationary housing member 16 and the support members 84, 88 to seal the fluid within the chamber 28. This embodiment offers the advantage of eliminating both of the large diameter seals 46 (shown in FIG. 1) from the clutch assembly 10. The seals 92 have a significantly smaller diameter than seal 46 and are less expensive and easier to install.

One advantage of of the combination of a planetary gear assembly 22 and a magneto Theological clutch is that the combination increases the torque transmitted by the clutch when it is attached to the ring gear. The torque at the ring gear is equal to the ratio of the number of ring gear teeth to the number of sun gear teeth multiplied by the torque at the sun gear rather than the torque at the carrier, which is equal to the quantity of one (1) plus the ratio of the number of ring gear teeth to the number of sun gear teeth multiplied by the torque at the sun gear.

INDUSTRIAL APPLICABILITY

The present invention relates generally to a clutch assembly as used in an earthmoving machine. The clutch assembly receives input from an engine and selectively supplies torque to a power-take-off. The clutch includes a stationary housing member, a rotating member supported for rotation with respect to the stationary housing member, and a planetary gear assembly operably interconnecting the rotating member to an output shaft. The planetary gear assembly reduces the magnitude of speed supplied to the output shaft. An actuating mechanism is used to switch the rotating member between a disengaged position where the rotating member rotates freely with respect to the stationary housing member and an engaged position where the rotating member is grounded to the stationary housing member. The actuating mechanism is comprised of a magneto Theological fluid and a plurality of actuation coils. An electric current is supplied to the actuation the coils, creating a magnetic field in the magneto rheological fluid. When a current is applied to the coils, the rotating member is placed in the engaged position and when there is no current in the coils, the rotating member is in the disengaged position.

The invention has been described in an illustrative manner, and it is to be understood that the terminology which has been used is intended to be in the nature of words of description rather than of limitation.

Other aspects, objects, and features of the present invention can be obtained from a study of the drawings, the disclosure, and the appended claims.

What is claimed is:

1. A clutch assembly for transferring torque from an input to an output comprising;

a stationary housing member;

a rotating member supported for rotation with respect to said stationary housing member about an axis of rotation;

an input for driving said rotating member;

an output for receiving torque from said rotating member;

a planetary gear assembly operably interconnecting said rotating member to said output wherein said planetary gear assembly reduces the magnitude of speed from said input to said output;

an actuating mechanism for switching said rotating member between a disengaged position where said rotating member rotates freely with respect to said stationary housing member and an engaged position where said rotating member is grounded to said stationary housing member; and wherein a chamber is formed between said stationary housing and said rotating member and wherein said actuating mechanism is comprised of a magneto rheological fluid received in said chamber and a plurality of actuation coils for selectively applying a current to said magneto rheological fluid such that when a current is applied to paid fluid said rotating member is in said engaged position and when there is no current said rotating member is in said disengaged position.

2. An assembly as set forth in claim 1, wherein said input is an input shaft receiving torque from an engine and said output is an output shaft supplying increased torque to a machine system.

3. An assembly as set forth in claim 2, wherein said planetary gear assembly includes a sun gear supported for rotation about said axis with said input shaft and a plurality of planet gears spaced circumferentially about said sun gear and engaging said rotating member.

4. An assembly as set forth in claim 3 wherein said rotating member causes said planet gears to rotate about said sun gear when said rotating member is in said engaged position.

5. An assembly as set forth in claim 4, further including a carrier fixed for rotation with said planet gears and rotatably supported on said input shaft, said carrier adapted for transmitting torque from said planet gears to said output shaft.

6. An assembly as set forth in claim 5, further including a drive gear fixed for rotation with said carrier, said drive gear adapted for engaging a mating gear supported on said output shaft.

7. An assembly as set forth in claim 1 including a plurality of grooves extending about an exterior surface of said rotating member for receiving said actuation coils.

8. An assembly as set forth in claim 1 wherein said coils are supported on an interior surface of said stationary housing member and are held in place by a plurality of spacers supported by said stationary housing member.

9. An assembly as set forth in claim 8, wherein said spacers have a predetermined thickness such that there is a gap formed between said spacers and said rotating member to form said chamber.

10. An assembly as set forth in claim 1 including at least one seal between said stationary housing member and said rotating member for sealing said fluid within said chamber.

11. An assembly, as set forth in claim 1, further including at least one bearing installed between said stationary housing member and said rotating member for rotatably supporting said rotating member with respect to said housing member.

12. An assembly, as set forth in claim 1, further including at least one bushing installed between said stationary housing member and said rotating member for providing a bearing surface as said rotating member rotates about said axis of rotation.

13. A magneto theological clutch assembly for transferring torque from an input shaft to an output shaft comprising a stationary housing member;

a rotating member supported for rotation with respect to said stationary housing member about an axis of rotation, said rotating member being spaced apart from said stationary housing member at a predetermined distance to define a chamber therebetween;

an input shaft for driving said rotating member;

an output shaft for receiving torque from said rotating member and transmitting torque to a machine system;

an actuating mechanism including magneto rheological fluid and a plurality of actuation coils for switching said rotating member between a disengaged position where said rotating member rotates freely with respect to said stationary housing member and an engaged position where said rotating member is grounded to said stationary housing member; and a planetary gear assembly operably interconnecting said rotating member to said output shaft wherein said planetary gear assembly reduces the magnitude of speed from said input shaft to said output shaft.

14. An assembly, as set forth in claim 13, wherein said magneto rheological fluid is received within said chamber and wherein an electric current is applied to said coils to switch said rotating member from said disengaged position to said engaged position.

15. An assembly, as set forth in claim 14, wherein said magneto rheological fluid has a predetermined centrifugal load limit dependent upon rotational speed of said rotating member, and wherein said rotating member is a planetary ring gear interacting with said planetary gear assembly to reduce rotational speed from said input shaft to said output shaft and prevent said magneto rheological fluid from exceeding said predetermined centrifugal load limit when said rotating member is in said engaged position.

16. An assembly, as set forth in claim 14, further including a plurality of grooves extending about an exterior surface of said rotating member for receiving said actuation coils.

17. An assembly, as set forth in claim 16, wherein said grooves define a depth and a width, said grooves being spaced apart from one another by up to two times said width to ensure that proper flux is supplied by said coils to said magneto rheological fluid.

18. An assembly, as set forth in claim 14, wherein said coils are supported on an interior surface of said stationary housing member and are held in place by a plurality of spacers supported by said stationary housing member.

19. An assembly, as set forth in claim 18, wherein said spacers have a predetermined thickness such that there is a gap formed between said spacers and said rotating member to form said chamber.

20. An assembly, as set forth in claim 14, wherein said planetary gear assembly includes a sun gear supported for rotation about said axis with said input shaft, and a plurality of planet gears spaced circumferentially about said sun gear and engaging said rotating member.

21. An assembly, as set forth in claim 20, wherein said rotating member is a planetary ring gear that causes said planet gears to rotate about said sun gear when said ring gear is in said engaged position.

22. An assembly, as set forth in claim 21, further including a carrier fixed for rotation with said planet gears and rotatably supported on said input shaft, said carrier adapted for transmitting torque from said planet gears to said output shaft.

23. An assembly, as set forth in claim 22, further including a drive gear fixed for rotation with said carrier, said drive gear adapted for engaging a mating gear supported on said output shaft.

24. An assembly, as set forth in claim 23, wherein said input shaft, said sun gear, said carrier, and said drive gear are concentric.

25. An assembly, as set forth in claim 14, further including at least one seal between said stationary housing member and said rotating member for sealing said fluid within said chamber.

26. An assembly, as set forth in claim 14, further including a support shaft rotatably supported on said input shaft for rotatably supporting said rotating member with respect to said stationary housing member.

27. An assembly, as set forth in claim 26, further including at least one support member fixed for rotation with said rotating member and supported on said support shaft by at least one bearing, said support member having a flange for receiving at least one seal for sealing said fluid within said chamber.

28. An assembly, as set forth in claim 14, further including at least one bushing installed between said stationary housing member and said rotating member, said bushing adapted for providing a bearing surface as said rotating member rotates about said axis of rotation.

29. An assembly, as set forth in claim 14, wherein said stationary housing member is mounted within said rotating member.

30. An assembly as set forth in claim 30, further including a planetary ring gear fixed for rotation with said rotating member about said axis of rotation.

31. An assembly, as set forth in claim 30, further including a support member fixed to said ring gear and rotatably supported on said stationary housing member.

* * * * *

UNITED STATES PATENT AND TRADEMARK OFFICE
CERTIFICATE OF CORRECTION

PATENT NO. : 6,102,827
DATED : August 15, 2000
INVENTOR(S) : Max J. Teasdale, Kent C. Bates, Jose M. Salazar-Vior It is certified that error appears in the above-identified patent and that said Letters Patent is hereby corrected as shown below:

Column 6, line 11, delete "paid" and insert --said--

Column 8, line 41, delete "claim 30" and insert --claim 29--

In the Abstract:

In the Abstract, line 14, after the word "magnetic", delete "flux.", and insert --field in the magneto rheological fluid.--.

Signed and Sealed this

Twenty-fourth Day of April, 2001

Attest:

NICHOLAS P. GODICI

Attesting Officer    Acting Director of the United States Patent and Trademark Office